United States Patent [19]

Vasta

[11] Patent Number: 4,513,060
[45] Date of Patent: Apr. 23, 1985

[54] CHLOROSULFONATED POLYETHYLENE COATING COMPOSITION

[75] Inventor: Joseph A. Vasta, Wilmington, Del.

[73] Assignee: E. I. Du Pont de Nemours and Company, Wilmington, Del.

[21] Appl. No.: 578,031

[22] Filed: Feb. 8, 1984

[51] Int. Cl.³ .............................................. C08L 23/34
[52] U.S. Cl. .................................... 428/416; 428/421; 523/400; 523/435
[58] Field of Search ............... 523/435, 400; 525/113, 525/120; 428/416, 421, 463

[56] References Cited

U.S. PATENT DOCUMENTS

| | | | |
|---|---|---|---|
| 3,600,469 | 3/1971 | Sato et al. | 525/120 |
| 3,891,606 | 6/1975 | Kogon | 528/57 |
| 3,899,438 | 8/1975 | Kalil | 528/71 |
| 4,424,353 | 1/1984 | Meyer et al. | 528/94 |

OTHER PUBLICATIONS

Fluorad ® Coating Additives; Technical Bulletin--Commercial Chemicals Division; 3M Company.
Chlorosulfonated Polyethylene-A New Binder for Use in Paints; 1958, Kelly et al.; Reprint-Federation of Paint & Varnish Prod. Clubs' Digest.
Coatings of Hypalon ® 20 Synthetic Rubber; Roche; Elastomers Div., du Pont Co.; 1956.

*Primary Examiner*—Lewis T. Jacobs

[57] ABSTRACT

A coating composition containing 10–80% by weight of binder and 20–90% by weight of an organic solvent in which the binder is
(1) a chlorosulfonated polyethylene,
(2) an epoxy resin,
(3) a polyamine curing agent, and
(4) a bicyclic amidine.

The composition is used as a primer or topcoating for metal substrates and curings at ambient temperatures and provides a finish that has excellent adhesion to the substrate and is tough, durable, weatherable and corrosion resistant.

13 Claims, No Drawings

CHLOROSULFONATED POLYETHYLENE COATING COMPOSITION

BACKGROUND OF THE INVENTION

This invention is related to a coating composition and in particular to a chlorosulfonated polyethylene coating composition that cures at ambient temperatures.

Chlorosulfonated ethylene polymers are inert to strong acids and strong bases and are resistant to weathering and salt water corrosion and are tough and abrasion resistant. Coatings of these polymers are extremely useful for protecting metal substrates exposed to chemicals and weathering. Typically, these coating would be useful in chemical plants and oil refineries to coat pipes, vessels, storage tanks, and other equipment, useful for coatings for offshore oil well platforms, barges, and ships, and useful for protective coatings in combination with fluorocarbon polymer coatings for the interior of smoke stacks of utility companies. However, conventional coatings formed with chlorosulfonated ethylene polymers either require curing at elevated temperatures which is not possible with the aforementioned large structures or require a long time for curing such as one to two weeks during which time the coating can easily be damaged. A coating compositions is needed that will cure rapidly at ambient temperatures.

The coating composition of this invention is directed to a composition that cures rapidly at ambient temperatures, has excellent adhesion to a variety of substrates, and is weatherable, corrosion and abrasion resistant.

SUMMARY OF THE INVENTION

A coating composition containing 10-80% by weight of binder and 20-90% by weight of an organic solvent; wherein the binder is
(1) a chlorosulfonated polyethylene having a weight average molecular weight of about 75,000 to 300,000 determined by gel permeation chromatography and having a chlorine content of 20 to 50% by weight and a sulfur content of 0.7 to 2.0% by weight;
(2) an epoxy resin;
(3) a polyamine curing agent of the formula

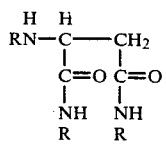

where R is $R^1NH_2$ and $R^1$ is an aliphatic or cycloaliphatic hydrocarbon radical; and
(4) a bicyclic amidine.

DETAILED DESCRIPTION OF THE INVENTION

The coating composition contains about 10-80% by weight binder and about 20-90% by weight organic solvent. The binder is a blend of a chlorosulfonated polyethylene, an epoxy resin, a polyamine curing agent and a bicyclic amidine. One of the advantages of the composition is that it cures rapidly at ambient temperatures and baking is not required. Therefore, the composition can be used on large structures such as ships, barges, chemical storage tanks, chemical reactors and other typical large equipment used in refineries and chemical plants. These structures could not be subjected to baking temperatures using conventional techniques and therefore conventional compositions that require baking cannot be used.

The chlorosulfonated polyethylene is a partially chlorinated polyethylene containing sulfonyl chloride groups and has the formula

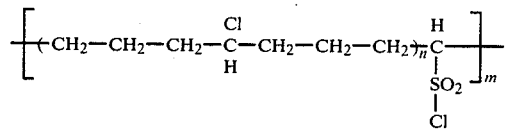

where m and n are positive integers of about 5-25. The polymer has a weight average molecular weight of about 75,000 to 300,000 and preferably, about 100,000 to 150,000 to form a high quality composition. Polymers in the lower end of the molecular weight range are preferred for forming a composition with higher binder content.

Molecular weight, as used herein, is determined by gel permeation chromatography using polymethyl methacrylate as a standard.

The chlorosulfonated polyethylene has a chlorine content of about 20-50% by weight and preferably about 29-43% by weight and a sulfur content of about 0.7 to 2.0% by weight and preferably about 1.1-1.5% by weight.

An epoxy resin that can be used in the composition has the formula

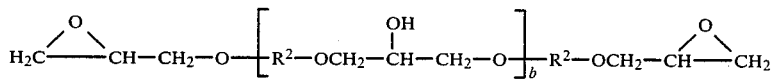

where b is a positive integer of about 0.5 to 4. Preferably, the epoxy resin is the polymerization product of epichlorohydrin and bisphenol A. In a preferred epoxy resin, $R^2$ in the above formula is

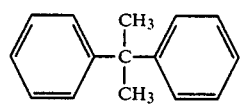

Typical of these preferred epoxy resins are "Epon" 828 having an equivalent weight of about 185-192 manufactured by Shell Chemical Company and DER 331 having an equivalent weight of about 182-190 manufactured by The Dow Chemical Company. The equivalent weight is the grams of resin that contain one gram equivalent of epoxide.

An epoxy novolac resin that can be used in the composition has the formula

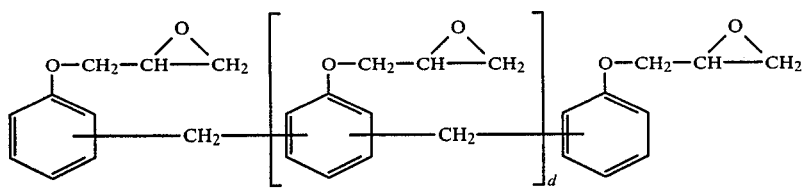

where d is a positive integer of about 0.2–2. Preferred epoxy novolac resins are DEN 431 where d has an average value of 0.2, DEN 438 where d has an average value of 1.6 and DEN 439 where d has an average value of 1.8. These resins are manufactured by the Dow Chemical Company.

The coating composition contains a polyamine curing agent of the formula

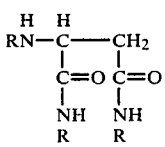

where R is $R^1NH_2$ and $R^1$ is an aliphatic or cycloaliphatic hydrocarbon radical.

The curing agent is prepared by reacting 3 moles of an aliphatic or cycloaliphatic polyamine with 1 mole of a dialkyl maleate. Reaction temperatures of about 100°–150° C. are used for about 1–6 hours to form the curing agent while an alkanol resulting from the reaction is removed.

Typical polyamines used to form the curing agent are isophorone diamine which is 3-aminoethyl-3,5,5-trimethyl cyclohexylamine, hexamethylene diamine, ethylene diamine, 1,4-clclohexane bis(methylamine), 1,2-diaminopropane, propylene diamine, diethyl ether diamine and trimethyl hexamethyl methylene diamine. Typical dialkyl maleates are dimethyl maleate, diethyl maleate, ethyl methyl maleate, dipropyl maleate, dibutyl maleate and the like.

One preferred curing agent is the reaction product of isophorone diamine and dimethyl maleate and has the following structural formula

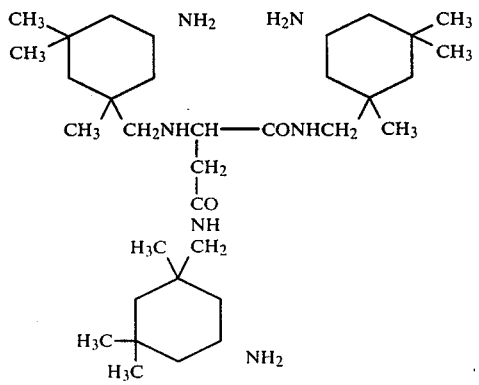

To decrease curing time and increase toughness of finishes of the composition, a bicyclic amidine is used in the composition. The bicyclic amidine also significantly extends the "pot life" of the composition after all of the constituents of the composition are mixed together. The composition contains about 0.1–3% by weight, based on the weight of the binder, of the bicyclic amidine. Preferably, the composition contains about 0.2–3% by weight, based on the weight of the binder, of the bicyclic amidine. One preferred bicyclic amidine is 1,8-diaza-bicyclo(5,4,0)-undecene-7.

About 1 to 4% by weight, based on the weight of the binder, of phenol can be added to the composition to decrease curing time and enhance toughness of the resulting finish.

Preferably, the binder of the coating composition contains 40–85% by weight of the chlorosulfonated polyethylene, 9–44% by weight of epoxy resin, 3–20% by weight of the polyamine curing agent, and 0.1–3% by weight of bicyclic amidine.

About 0.5–5% by weight, based on the weight of the binder, of a chloride ion scavenger can be added to the composition. The metal ion of the scavenger reacts with any residual chlorides which may be on a substrate being painted thereby reducing corrosion of the substrate. For example, the steel on oil well platforms in the ocean is covered with a salt residue. If the salt on the surface of the steel is not bound in some manner, corrosion starts and rapidly accelerates.

Typical chloride ion scavengers that can be used are as follows: lead naphthenate which is preferred, lead tallate and lead octoate.

When the composition is applied over substrates that are moist or wet, about 0.1–3% by weight, based on the weight of the binder, of a silicone wetting agent is added to the composition to insure thorough wetting of the surface and penetration to the metal. Typical silicone wetting agents are as follows: oxyethylene methyl siloxanes such as "Silwet" L-77 and "Silwet" L-7607 made by Union Carbide and other condensation products of ethylene oxide and alkyl siloxane.

Generally, the composition is pigmented and contains pigments in a pigment to binder weight ratio of about 20:100 to 200:100. The pigments are dispersed in the composition by conventional techniques such as ball milling, sand grinding, attritor grinding and the like. Typical pigments that can be used are as follows: metallic oxides such as titanium dioxide, iron oxide, zinc oxide, chromate pigments such as lead chromate, filler pigments such as barytes, talc, china clay and the like, phosphate pigments such as zinc phosphate, zinc phospho oxide, carbon black, black molybdate oxide pigments, barium metaborate pigments and the like.

One particularly useful combination of pigments for a corrosion resistant primer is the following: titanium dioxide, barytes, talc, carbon black and zinc phospho oxide.

The composition generally is provided in two components. Component A contains chlorosulfonated polyethylene, epoxy resin and pigments. Component B contains the polyamine curing agent and bicyclic amidine. The two components are blended together a relatively short time before application and the resultant composition is applied to a substrate.

Solvents used in the composition are chosen to provide curing at ambient temperatures and have a high evaporation rate at these temperatures. Typically useful solvents are as follows: alcohols such as methanol, ethanol, propanol, isopropanol, benzyl alcohol, acetates such as ethyl acetate and other solvent such as toluene, xylene, and the like.

The coating composition can be applied by conventional methods such as spraying, electrostatic spraying, brushing, dipping, flow coating and the like. The composition can be applied to a variety of substrates such as steel, iron, painted steel, treated steel such as phosphatized steel, aluminum, plastics, wood, glass and the like. The composition can be fully cured as demonstrated by resistance to solvents such as methyl ethyl ketone in about 24 to 48 hours. Higher curing temperatures reduce the curing time; for example, the finish can be heated to about 80°-120° C. for 0.5-2.0 hours for rapid curing. The resulting finish has excellent adhesion to the substrate, good corrosion resistance, is weatherable and durable and with proper pigmentation can be used as a primer or as a topcoat. The composition is particularly useful as an overcoat primer for steel substrates coated with an inorganic zinc primer.

One particularly chemical resistant and durable combination of finishes comprises a primer layer about 125 to 150 microns thick on a steel substrate of the cured composition of this invention and a top layer that is in superimposed adherence to this primer layer and is about 500 to 750 microns thick of a cured fluorocarbon polymer of vinylidene fluoride and hexafluoropropylene.

The following example illustrates the invention. All parts and percentages are on a weight basis unless otherwise indicated. Molecular weights are determined by gel permeation chromatography using polymethyl methacrylate as a standard.

EXAMPLE

The following constituents were blended together and charged into a ball mill and ground until a uniform dispersion was formed:

|  | Parts By Weight |
|---|---|
| Chlorosulfonated polyethylene solution (25% solids in toluene solvent of a chlorosulfonated polyethylene having a weight average molecular weight of about 115,000 determined by gel permeation chromatography and contains about 43% clorine and about 1.4% sulfur) | 44.75 |
| D.E.R. 331 epoxy resin (liquid epoxy resin of bisphenol A and epichlorohydrin having an epoxide equivalent weight of about 182-190 and a viscosity measured at 25° C. of 11,000-14,000 cps) | 4.79 |
| Titanium dioxide pigment | 9.93 |
| Barium sulfate pigment | 7.61 |
| Talc | 11.68 |
| Ethyl acetate | 8.87 |
| Toluene | 6.08 |
| "Fluorad" FC 430 solution (2% solution in toluene of a nonionic fluorochemical surfactant) | 0.56 |
| Total | 94.27 |

Composition B was prepared by blending together the following constituents:

|  | Parts By Weight |
|---|---|
| Polyamine curing agent solution (55% solids in isopropanol of the reaction product of 3 moles of isophorone diamine and dimethyl maleate) | 2.28 |
| Bicyclic amidine [1,8-diaza-bicyclo (5,4,0)undecene-7] | 0.16 |
| Isopropanol | 3.29 |
| Total | 5.73 |

Composition B was thoroughly blended with the pigment dispersion prepared above and reduced with toluene to a spray viscosity of about 25 seconds measured with a #2 Zahn cup to form Coating Composition 1. Coating Composition 1 was sprayed onto a grit blasted steel and aluminum panels. In each case thick films were applied by allowing flash drying between each pass on spray application. The coatings were allowed to dry at ambient temperatures and gave a tack free film about 125 microns thick in about 15 minutes. In about 24 hours, the coatings were resistant to methyl ethyl ketone. After 3-7 days, the coatings were fully cured and were resistant to solvents, acids and alkali and had excellent durability and weatherability.

A gray primer compositiion was prepared as follows:

|  | Parts By Weight |
|---|---|
| Chlorosulfonated polyethylene solution (described above) | 38.84 |
| Epoxy resin (described above) | 6.51 |
| Titanium dioxide pigment | 7.69 |
| Barium sulfate pigment | 6.06 |
| "Nalzin" 2 pigment (zinc phospho oxide pigment) | 7.69 |
| Talc | 9.23 |
| Carbon black pigment | 0.16 |
| Ethyl acetate | 8.51 |
| Toluene | 5.89 |
| "Fluorad" FC 430 solution (described above) | 0.56 |
| Total | 91.12 |

The above constituents were blended together and charged into a ball mill until a uniform dispersion was formed.

Composition C was prepared by blending together the following constituents:

|  | Parts By Weight |
|---|---|
| Polyamine curing agent (described above) | 3.18 |
| Phenol | 0.53 |
| Bicyclic amidine (described above) | 0.18 |
| Benzyl alcohol | 0.18 |
| Isopropanol | 4.81 |
| Total | 8.88 |

Composition C was thoroughly blended with the gray dispersion and the resulting primer composition was reduced to a spray viscosity with toluene and sprayed onto untreated steel panels. Solvent was allowed to flash off between passes and the primer was allowed to dry at ambient temperatures in about 15 minutes to form a primer coat about 100 microns thick.

The above prepared coating composition 1 was then sprayed onto aluminum panels primed with the above primer and allowed to flash dry between each pass of the spray gun and dried at ambient temperatures for about 20 minutes to provide a total topcoating thickness of about 250 microns. The coating has excellent resistance to corrosion by acids and alkali and excellent flexibility and weatherability.

I claim:

1. A coating composition comprising 10–80% by weight of binder and 20–90% by weight of an organic solvent; wherein the binder consists essentially of about
   (1) 40–85% by weight, based on the weight of the binder, of a chlorosulfonated polyethylene having a weight average molecular weight of about 75,000 to 300,000 determined by gel permeation chromatography and having a chlorine content of 20 to 50% by weight and a sulfur content of 0.7 to 2.0% by weight;
   (2) 9–44% by weight, based on the weight of the binder, of an epoxy resin;
   (3) 3–20% by weight, based on the weight of the binder, of a polyamine curing agent of the formula

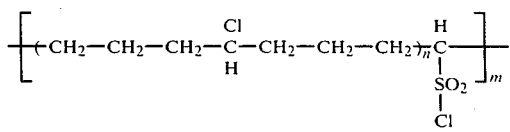

where R is $R^1NH_2$ and $R^1$ is an aliphatic or cycloaliphatic radical; and
   (4) 0.1–3% by weight, based on the weight of the binder, of a bicyclic amidine.

2. The coating composition of claim 1 containing pigment in a pigment-to-binder weight ratio of about 20:100 to 200:100.

3. The coating composition of claim 2 in which the chlorosulfonated polyethylene has the formula

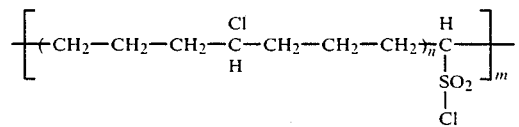

where m and n are positive integers of about 5–25 and has a weight average molecular weight of about 100,000 to 150,000.

4. The coating composition of claim 3 in which the epoxy resin has the formula

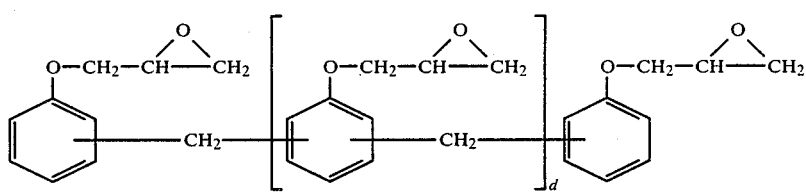

where $R^2$ is an aromatic radical and b is a positive integer of about 0.5 to 4.

5. The coating composition of claim 4 in which $R^2$ is

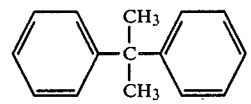

6. The coating composition of claim 3 in which the epoxy resin is an epoxy novolac resin of the formula

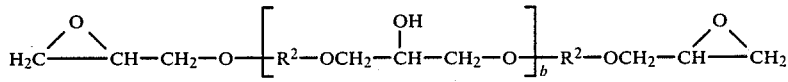

where d is a positive integer of about 0.2–2.

7. The coating composition of claim 3 in which R is

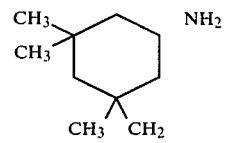

8. The coating composition of claim 3 in which the bicyclic amidine is 1,8-diaza-bicyclo(5,4,0)-undecene-7.

9. The coating composition of claim 3 containing about 0.1–3% by weight, based on the weight of the binder, of a fluorochemical surfactant.

10. The coating composition of claim 2 in which the binder consists essentially of about
    (1) 40–85% by weight, based on the weight of the binder, of a chlorosulfonated polyethylene having the formula

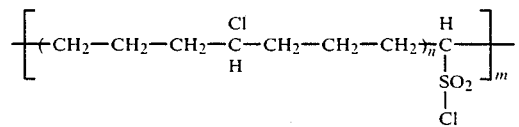

where m and n are positive integers of about 5–25 and has a weight average molecular weight of about 100,000 to 150,000.
    (2) 9–44% by weight, based on the weight of the binder, of an epoxy resin of the formula

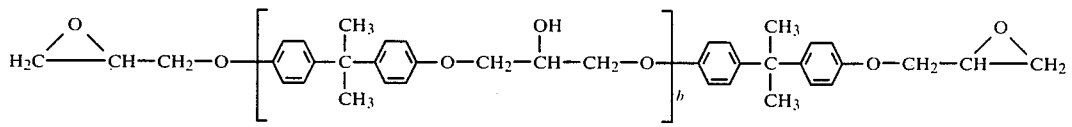

where b is a positive integer of about 0.5 to 4;

(3) 3-20% by weight, based on the weight of the binder, of a polyamine curing agent of the formula

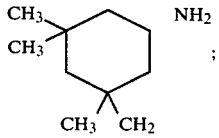

where R is

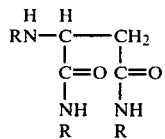

and (4) 0.01-3% by weight of 1,8-diaza-bicyclo(5,4,0)-undecene-7.

11. A two-component composition wherein the two components are mixed together to form a composition comprising about 10-80% by weight binder and 20-90% by weight organic solvent and wherein the binder consists essentially of about 40-85% by weight, of chlorosulfonated polyethylene,
9-44% by weight of epoxy resin,
3-20% by weight of polyamine curing agent, and
0.1-3% by weight of bicyclic amidine and wherein the the components comprise component (1) a solution of a chlorosulfonated polyethylene having a weight average molecular weight of about 75,000 to 300,000 determined by gel permeation chromatography and having a chlorine content of 20 to 50% by weight and a sulfur content of 0.7 to 2% by weight and an epoxy resin.

component (2) a polyamine curing agent of the formula

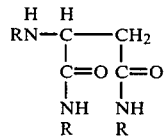

where R is $R^1NH_2$ and $R^1$ is an aliphatic or cycloaliphatic radical and a bicyclic amidine.

12. A substrate coated with a cured layer of the composition of claim 1.

13. A metal substrate coated with a cured primer layer of the composition of claim 2 and having in superimposed adherence to the primer layer a cured layer of a fluorocarbon polymer comprising vinylidene fluoride and hexafluoropropylene.

* * * * *